W. R. & J. R. CAIN.
CHEESE HOOP.
APPLICATION FILED MAR. 6, 1911.

1,133,261. Patented Mar. 30, 1915.

Witnesses.
A. Tompkins
E. Fuchsback

Inventors
William R. Cain
John R. Cain
By Hardway & Cadey
Attorneys.

UNITED STATES PATENT OFFICE.

WILLIAM R. CAIN AND JOHN R. CAIN, OF HOUSTON, TEXAS.

CHEESE-HOOP.

1,133,261.  Specification of Letters Patent.  Patented Mar. 30, 1915.

Application filed March 6, 1911. Serial No. 612,545.

*To all whom it may concern:*

Be it known that we, WILLIAM R. CAIN and JOHN R. CAIN, citizens of the United States, residing at Houston, in the county of Harris and State of Texas, have invented certain new and useful Improvements in Cheese-Hoops, of which the following is a specification.

Our invention relates to new and useful improvements in cheese hoops.

The object of the invention is to provide a device of the character described composed of a suitable frame work arranged to support a wire gauze or netting of which the sides and top of the hoop is chiefly composed; and having a section of said frame work, and the gauze carried thereby, hinged to the main body of the hoop so that the same may be folded back in order to expose a portion of the cheese, protected by the hoop, when it is desired to cut away a portion of said cheese.

A further feature of the device resides in a pivotally mounted cheese support to which the hoop is detachably secured by means hereinafter fully described.

Finally the object of the invention is to provide a device of the character described of simple construction and operation and one which will effectually protect the cheese against dust, insects, etc. and at the same time render said cheese readily accessible when it is desired to remove a portion or all of the same.

With the above and other objects in view our invention has particular relation to certain novel features of construction, operation and arrangement of parts an example of which is given in this specification and illustrated in the accompanying drawings, wherein:—

Figure 1:
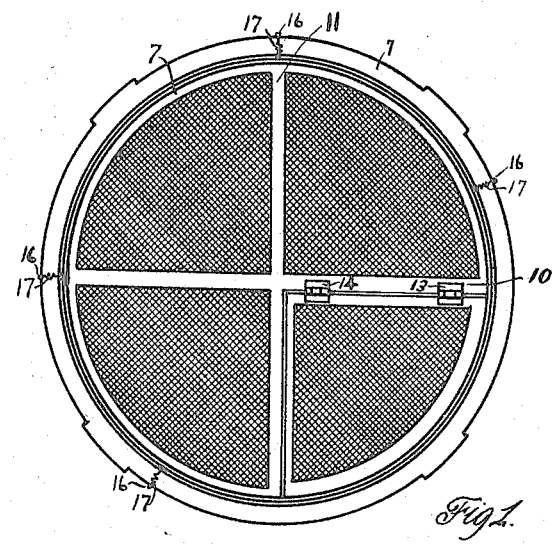
Figure 2:
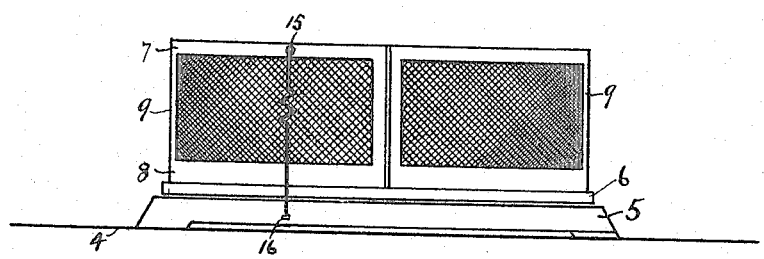
Figure 3:
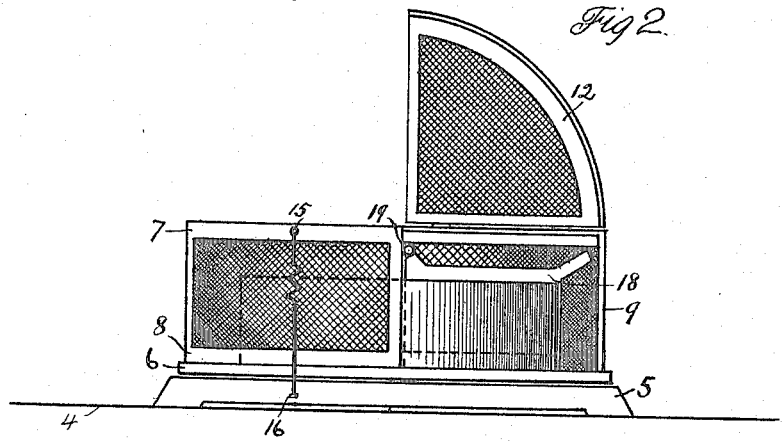

Figure 1 is a plan view of the device. Fig. 2 is a side elevation thereof, and Fig. 3 is a side elevation of the hoop showing the folding portion, or door open.

Referring now more particularly to the drawings the numeral 4 refers to a suitable base upon which the frame 5 is supported. This frame is designed to support the rotatable table 6, which is pivotally mounted thereon and which supports the hoop and the cheese which is to be protected thereby. This hoop is composed of a suitable frame work comprising the top and bottom members 7 and 8. These members are circular, in shape and are secured together by means of bars 9 and the top member 7 is provided with suitable cross braces 10 and 11, so as to form a complete frame work for the support of the wire gauze, or netting, forming the sides and top of the hoop. The entire frame is preferably composed of light wood, or other similar light and durable material. A section of the hoop 12 is made removable, as shown in the figures, the removable section preferably comprising onefourth of the entire device and this section is hinged to the cross brace 10 by means of hinges 13 and 14 so as to form a kind of door which may be folded back upon the top of the hoop and when so opened will render the interior of the hoop accessible; but when said portion is closed it so alines with the remainder of the hoop proper as to become a continuation thereof, and renders the device complete and entirely incloses the contents to be protected thereby. This section 12 is composed of a frame work and netting similar to the remainder of the hoop proper.

At suitable intervals around the member 7, we have provided lugs, or catches 15, which are carried by said member and at coresponding intervals around the frame 5 we have also provided similar lugs 16 which are carried by said frame 5. The numeral 17 refers to resilient ties or fastenings which engage with the corresponding lugs 15 and 16, but which may be readily detached therefrom. These ties serve to hold the hoop upon the table 6, but permit said table and cheese to turn relative to the hoop.

The numeral 18 refers to a cutter which is hingedly attached to the frame work of the top of the hoop at the point 19 and which is designed to slice off the cheese in the well known manner. This cutter is inclosed by the hoop when not in use and is protected thereby.

As is readily obvious when the door 12 is open a considerable portion of the cheese will be exposed and may be cut away, but when the exposed portion has all been cut away the table and cheese carried thereby, may be rotated and an additional section of cheese exposed, which may then be cut away. It is obvious that when the door 12 is closed the cheese and cutter will be completely protected against dust and other foreign matter which would otherwise contaminate the same.

What we claim is:—

In a cheese hoop of the character described, the combination with a supporting frame, and a rotatable table mounted thereon and provided to support a cheese of a hoop mounted on said rotatable table and independently rotatable relative thereto, said hoop comprising a frame-work having a wire gauze wall and top and having a segment thereof hingedly attached to the top of said hoop so that it may be folded back on said top, a plurality of coil-springs detachably secured to said hoop and said frame and adapted to hold said hoop yieldingly upon the table and also hold said hoop against rotation relative to said table as described and for the purpose set forth.

In testimony whereof we have signed our names to this specification in the presence of two subscribing witnesses.

WILLIAM R. CAIN.
JOHN R. CAIN.

Witnesses:
J. W. YEAGLEY,
A. TOMPKINS.

Copies of this patent may be obtained for five cents each, by addressing the "Commissioner of Patents, Washington, D. C."